US010326797B1

(12) United States Patent
Murray et al.

(10) Patent No.: US 10,326,797 B1
(45) Date of Patent: Jun. 18, 2019

(54) PROVISIONING A SECURE CONNECTION USING A PRE-SHARED KEY

(71) Applicant: Clover Network, Inc., Sunnyvale, CA (US)

(72) Inventors: Brian Jeremiah Murray, Mountain View, CA (US); Narayanan Gopalakrishnan, Newark, CA (US)

(73) Assignee: Clover Network, Inc, Sunnyvale, CA (US)

( * ) Notice: Subject to any disclaimer, the term of this patent is extended or adjusted under 35 U.S.C. 154(b) by 0 days.

(21) Appl. No.: 16/150,625

(22) Filed: Oct. 3, 2018

(51) Int. Cl.
*H04L 9/08* (2006.01)
*H04L 29/06* (2006.01)
(Continued)

(52) U.S. Cl.
CPC .......... *H04L 63/166* (2013.01); *H04L 9/0825* (2013.01); *H04L 9/0877* (2013.01);
(Continued)

(58) Field of Classification Search
CPC ............ G06F 21/16; G06F 2221/0724; G06F 2221/0737; G06F 17/301; G06F 17/30194; G06F 21/6209; G06F 21/6218; G06T 1/0021; H04L 63/0823; H04L 9/0825; H04L 9/3247; H04L 63/10; H04L 63/0428; H04L 63/08; H04L 67/1097; H04L 9/30; H04L 2209/80; H04L 63/0807; H04L 63/083; H04L 9/0897; H04L 9/3226; H04L 9/3234; H04N 21/25866; H04N 21/26613; H04N 21/2743; H04N 21/41407; H04N 21/4223; H04N 21/42684; H04N 21/4788;
(Continued)

(56) References Cited

U.S. PATENT DOCUMENTS

2013/0173475 A1 7/2013 Lund
2013/0333006 A1* 12/2013 Tapling .................. G06F 21/42
726/6

(Continued)

OTHER PUBLICATIONS

"Pre-Shared Key Ciphersuites for Transport Layer Security (TLS)", Network Working Group, RFC 4279, Eronen et al., Dec. 2005.
(Continued)

Primary Examiner — Abiy Getachew
(74) Attorney, Agent, or Firm — Daylight Law, P.C.

(57) ABSTRACT

Methods and systems related to provisioning a secure connection are disclosed. One disclosed method includes storing a device secret on a secure element in a first device, storing a mapping from the device secret to a device identifier of the first device on a cloud architecture, generating a pairing key using a first connection protocol key generator on the secure element and the device secret, and generating the pairing key using a second connection protocol key generator on the cloud architecture and the device secret. The method also includes transmitting the pairing key from the cloud architecture to a second device in response to receiving the device identifier, mutually authenticating the first and second device using the pairing key, and adding the secure connection to the inter-device connection using the pairing key as stored on the first device and as stored on the second device.

28 Claims, 5 Drawing Sheets

(51) Int. Cl.
*H04W 12/04* (2009.01)
*H04W 12/06* (2009.01)

(52) U.S. Cl.
CPC ...... *H04L 63/0442* (2013.01); *H04L 63/0853* (2013.01); *H04W 12/04* (2013.01); *H04W 12/06* (2013.01)

(58) Field of Classification Search
CPC ......... H04N 21/63775; H04N 21/6582; H04N 21/8153; H04N 21/8166; H04N 21/8352; H04N 21/8358; H04N 5/44; H04W 12/02; H04W 12/04; H04W 12/06; H04W 12/08; G06Q 20/10
See application file for complete search history.

(56) References Cited

U.S. PATENT DOCUMENTS

| | | | |
|---|---|---|---|
| 2016/0086172 | A1 | 3/2016 | Kamal |
| 2016/0179855 | A1* | 6/2016 | Roman ................... H04L 63/08 707/744 |
| 2016/0309323 | A1* | 10/2016 | Zarakas ................ H04W 12/06 |
| 2017/0012778 | A1* | 1/2017 | Choyi ................. H04L 63/0884 |
| 2017/0178217 | A1* | 6/2017 | Ahuja ................. G06Q 30/0631 |

OTHER PUBLICATIONS

"TOTP: Time-Based One-Time Password Algorithm", Internet Engineering Task Force, RFC 6238, M'Raihi et al., May 2011.

* cited by examiner

100

200

400

PROVISIONING A SECURE CONNECTION USING A PRE-SHARED KEY

BACKGROUND

The establishment of secure connections between communicating devices is essential to preserve the privacy and data integrity of the information that passes between them. Wireless connections are particularly vulnerable to attacks from malicious entities that could use other nearby wireless devices to perform such an attack. Current security methods are designed to withstand the most common types of attacks, such as man-in-the-middle (MITM) attacks, denial of service (DoS) attacks, or address resolution protocol (ARP) poisoning attacks. While many of the nuances of secure communication vulnerabilities are known, the choice of a specific security configuration for a given set of wireless connected devices is not trivial. For example, one security configuration may be highly dependent on the unique capabilities of the software and hardware architectures on a type of device, such as the significant resources available to a system of a personal computer connected to a wi-fi router. Alternatively, wirelessly communicating devices may rely on short range communication, such as in the case of a smartphone using near field communication, to provide a level of security using the limited range of the wireless transmission. To meet this continually evolving context, new connection security solutions are under constant development.

Devices that communicate via wireless inter-device connections often collaborate in a system or network, as exemplified in the growing paradigm of the Internet of Things (IoT). As many of these devices are dependent on private information, the establishment of secure connections between two or more devices is a common need in personal, home, and business settings. One general example that spans these settings includes the secure connection between a multi-function, personal user device, such as a smart phone, and an application device, sometimes called a "dongle" or peripheral device. Personal user devices utilize a suite of communications protocols to maximize security and inter-device compatibility, while application devices are designed with limited hardware and software in order have a form factor convenient for personal use and remain market competitive. Driven by this asymmetry in device functionality, the establishment of a secure connection between a personal user device and an application device can be limited by the application device. Careful consideration must be given to the design of a system to provision such a connection that has both usability and security.

The Transport Layer Security (TLS) protocol is a well-developed, customizable security protocol that can be used to secure a wireless communicative connection between a personal user device and an application device. TLS can be configured to provision a secure connection using symmetric or asymmetric key encryption schemes. Authentication with TLS can be established using methods defined by the public-key infrastructure (PKI) framework, for example with the use of certificates signed by a trusted third party. Furthermore, two or more devices can establish secure communication through a process in which a TLS server is instantiated on one device while the other devices can communicate with the TLS server as clients. Subsequently, the server and clients can negotiate the desired key encryption and authentication schemes through a process called a "handshake," in which they both agree upon methods from series of pre-defined executable algorithms and server-client information transfers. It is of utmost importance that the key encryption and authentication methods within the handshake are implemented with the unique devices of the system in mind to enable the maximal security potential of the secure connection.

SUMMARY

Methods and systems related to provisioning a secure connection to an inter-device connection are disclosed. One system includes a first device, a second device, and a cloud architecture. The first device has a secure element that stores a device secret, instantiates a first connection protocol module, and instantiates a first connection protocol key generator. The cloud architecture stores a mapping from the device secret to an identification of the first device and instantiates a second connection protocol key generator. The first connection protocol key generator and the second connection protocol key generator are both configured to generate a pairing key using the device secret. The second device has a processor which instantiates a second connection protocol module, that is communicatively connected to the first device via the inter-device connection, that is configured to receive the identification of the first device from the first device, and that is configured to exchange the identification of the first device for the pairing key with the cloud architecture over a network connection. The first connection protocol module and the second connection protocol module are configured to mutually authenticate using the pairing key and add the secure connection to the inter-device connection using the pairing key.

One disclosed method includes storing a device secret on a secure element in the first device, and storing a mapping from the device secret to a device identifier of the first device on a cloud architecture. The method includes generating a pairing key using a first connection protocol key generator on the secure element and the device secret, and generating the pairing key using a second connection protocol key generator on the cloud architecture and the device secret. The method includes transmitting the pairing key from the cloud architecture to the second device in response to receiving the device identifier. The method includes mutually authenticating the first and second device using the pairing key as stored on the first device and as stored on the second device. The method includes adding the secure connection to the inter-device connection using the pairing key as stored on the first device and as stored on the second device.

One system comprises a first device, a second device, a secure element, a cloud architecture, a first connection protocol key generator, a second connection protocol key generator, a first connection protocol module, an application, and a second connection protocol module. The first device and the second device are connected with an inter-device connection. The first device has a secure element that stores a device secret. The cloud architecture stores the device secret and a mapping from the device secret to a device identifier of the first device. The first generation protocol key generator is on the secure element configured to generate a pairing key using the device secret. The second connection protocol key generator is on the cloud architecture configured to generate the pairing key using the device secret. The secure element in the first device instantiates the first connection protocol module. The second connection protocol module is on the second device. The application is on the second device, receives the pairing key from the cloud architecture, and instantiates the second connection protocol module. The cloud architecture is configured to transmit the pairing key to the second device in response to receiving the device identifier. The first connection protocol module and the second connection protocol module are configured to mutually authenticate using the pairing key and add a secure connection to the inter-device connection using the pairing key.

DETAILED DESCRIPTION

Figure 1:
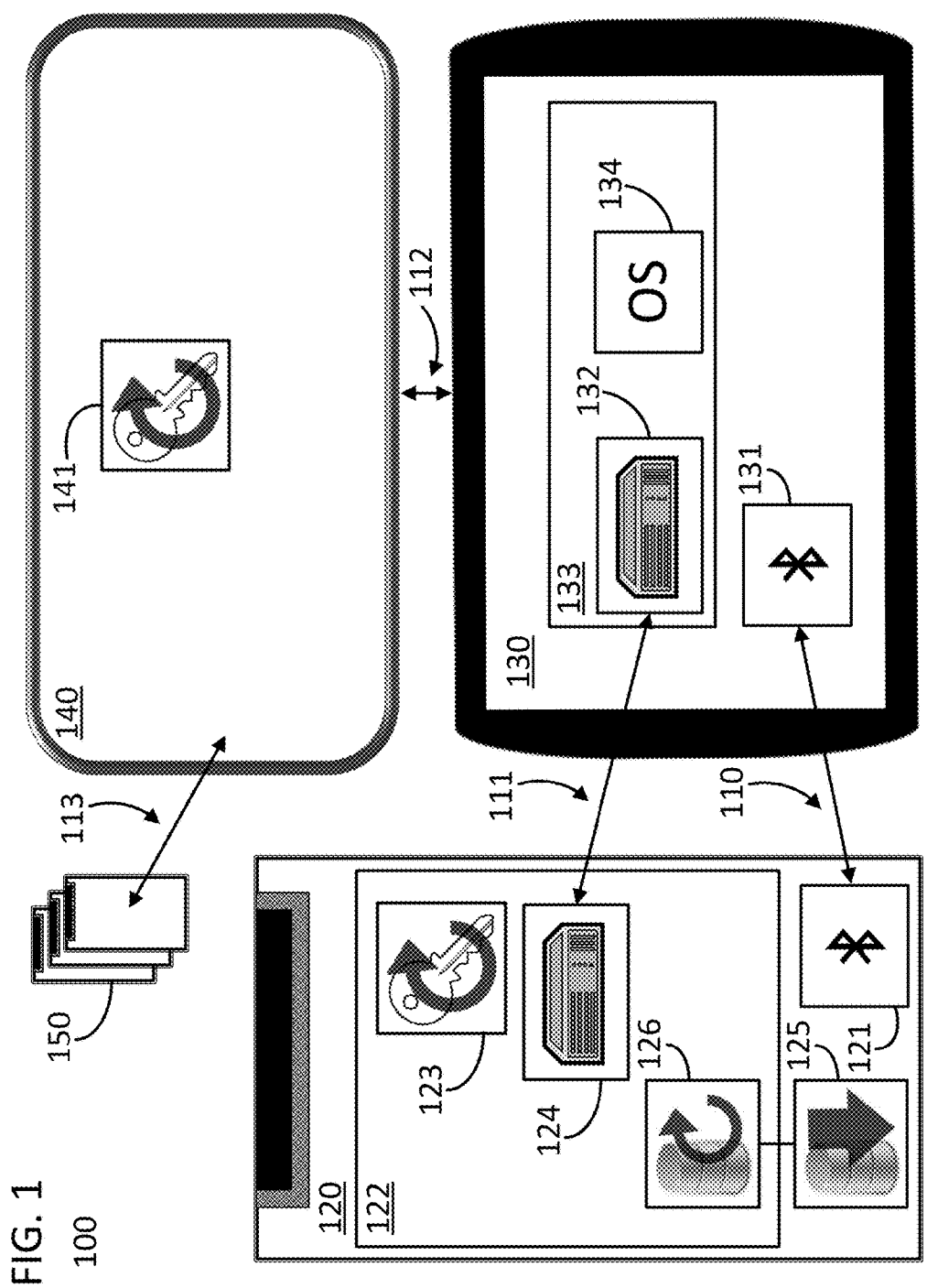
FIG. 1 illustrates a system for provisioning a secure connection to an inter-device connection between a first device and a second device, aided by a cloud architecture.

Specific methods and systems for provisioning a secure connection between two devices in accordance with the summary above are provided in this section. The methods and systems disclosed in this section are nonlimiting embodiments of the invention and are provided for explanatory purposes only. The detailed disclosure of these specific embodiments should not be applied to constrict the full scope of the invention.

In specific embodiments of the invention, a system is provided for adding a secure connection to an inter-device connection between communicating devices. For example, the secure connection can be a transport layer security (TLS) connection that utilizes the TLS protocol along with a shared secret that is either directly provisioned to, or derived on, the two devices. As another example, the secure connection can be a datagram transport layer security (DTLS) connection. Throughout this disclosure, TLS will be used as an exemplary connection type and protocol. However, the secure connection can involve other protocols in which a single key is used to provide both confidentiality and integrity for a bidirectional stream of data.

The establishment of a secure connection begins with authentication. Authentication is the process in which a user, device, application, server, cloud architecture, or otherwise-defined system entity proves its identity to a communicating party. Mutual authentication between two system entities is a bidirectional authentication process. In TLS protocol, the TLS server identity is authenticated to protect the client from becoming unwittingly compromised through sharing private information to a malicious third-party. When bidirectional information transfer must be safeguarded, for example in a secure communication of a first device and a second device disclosed herein, mutual authentication is desired. In principal, mutual authentication can be accomplished using a variety of encryption schemes. For example, the X.509 public key standard enables an authentication scheme using public keys contained within signed certificates to authenticate a server to a client in possession of a corresponding private key. More generally, public/private key encryption methods can be used in a system established within a public-key infrastructure (PKI) environment. The public/private key encryption paradigm is made robust using sufficiently complex key generation methods and authentication methods implemented by trusted third parties. Symmetric keys may also be used for mutual authentication. A "symmetric key" can refer to a single cryptographic key held by two communicating parties. The use of symmetric keys for mutual authentication can be made possible, for example, by both parties having access to a mutually known set of secret data. Symmetric key encryption and authentication protocols have relatively low computational and memory requirements, in comparison with public/private keys, and can be used for an expedient security handshakes in even simple devices.

Multiple encryption and authentication schemes are available to provision a secure connection using TLS protocol. The choice of the scheme is negotiated in a process called the handshake before the provisioning begins. The handshake involves a set of pre-defined methods known by both communicating parties. One example of a TLS handshake can be executed as follows. First, a shared secret is generated between a server and a client over an unsecured connection through the exchange of local session information from the server and client in combination with an agreed upon number or algorithm-generated data set called a pre-master secret key. Second, the server and client proceed with a secretly agreed upon, pre-programmed transformation to transform the pre-master secret key into a master secret key. The transformation should be computationally difficult to reverse as to securely generate an encryption key with an unsecured connection. A Diffie-Hellman key exchange is one example method that can be used to carry out the described first and second steps. Third, the master-secret key is used by both parties to make a message authentication code (MAC) secret key to be used during the session for the further generation of a symmetric session key that can be used, again by both parties, to encrypt and decrypt communication data.

In specific embodiments of the invention, the generation of the secure connection can be based on a secret data set called a "seed" with which a cryptographic key can be generated. The seed can be any set of secret data, for example a truly randomly generated number. Furthermore, the seed can be associated, or "mapped," to another set of data, such as a device identifier of a device in the system. A seed mapped in this way can be designated a "device secret" and can be combined with the device identifier to augment key generation during a subsequent step. A device can be assigned a device identifier from multiple sources, including a device serial number, a serial number of an internal component of the device, or any unique and categorizable identifier thereon. Seeds and, equivalently, device secrets can be utilized in the system as a shared secret in support of cryptographic key generation such as symmetric key generation. When multiple seeds are mapped to multiple devices through their respective device identifiers, the multiple mapped connections can be called a "mapping."

In specific embodiments of the invention, the system can provision a secure connection to an inter-device connection between a first device and a second device, in which a cloud architecture can be in communication with the second device. In these embodiments, the first device can have an identification of the first device and can store a seed. Additionally, the cloud architecture can store the seed as a device secret mapped to the identification of the first device, linking the seed with the first device. The identification of the first device can be a serial number of the first device. From the seed stored on the first device, a pairing key can be generated. The first device can transfer the identification of the first device over the inter-device connection to the second device. The second device can then transmit the identification of the first device to the cloud architecture. The cloud architecture, in response, can generate a pairing key from the device secret linked with the identification of the first device and send the pairing key to the second device. With their respective and identical pairing keys, the first device and the second device can complete a handshake to provision the secure connection by accomplishing mutual authentication and cryptographic scheme negotiation.

The first device, the second device, and the cloud architecture can instantiate modules. Modules can implement specific approaches for the method steps described herein. Module steps can be implemented using non-transitory, computer-readable media storing instructions that can be executed by a processor. Modules on communications devices can be configured to generate keys, establish and provision connections with other devices, negotiate communication protocols, and conduct other processes.

The first device, the second device, and the cloud architecture can include hardware elements. Hardware elements can be touch screen displays, flat-screen displays, touch pads, thumb print readers, image sensors, microphones, speakers, batteries, processors, relative clocks, absolute clocks, card readers, volatile memories, non-volatile memories, and other ancillary components. Hardware elements can enable wired and wireless communications, including web servers, modems, configurable radios, wireless transceivers, antennae, radio-frequency front-ends comprising decoder-encoders, multiplexers, switches, amplifiers, and filters, and other communications components. Hardware elements directed towards wired communications can be implemented in conjunction with any data cable type, including ethernet, token ring, coaxial, optical fiber, serial cable, Cat2, telephone cable, universal serial bus (USB) cable, or other data cable types used for sending digital information. Alternatively, data cables can be specific to the communication of video information, in which case the types of data cables can include s-video, component video, DVI, HDMI, display port, CoaXPress, and MHL, and other video cable types. Hardware elements directed towards wireless communications can support any standard type or frequency band, including such standards as the Wi-Fi/IEEE 802.11 series, EDGE, the EV-Do series, Flash-ODFM, GPRS, the HSPA standards, Lorawan, LTE, RTT, the UMTS series, WiMAX, 6LoWPAN, the Bluetooth series, IEEE 802.15.4-2006, Thread, UWB, Wireless USB, ZigBee, ANT+, and other communications standards.

The first device, the second device, and the cloud architecture can have enabling secure elements that are resistant to tampering or compromising attack. One example of a secure element is a secure processor that can generally perform as a standard processor at reduced performance by being altered to limit non-necessary functions for improved security. An application-specific integrated circuit (ASIC) or a discrete integrated circuit can be designed to execute only specific, secure functions and not other general-purpose functions, and thus can be a secure element. An otherwise general-purpose processor can be modified to be a secure element, or include a secure element, through certain modifications, such as the physical partitioning of the secure element from the general hardware elements on the same chip. A secure element can also be placed in the same package as a general processor, but be located on a different physical chip in that package. Alternatively, a secure element can be secured by stripping away vulnerable communication paths as to prevent communication with unsecured elements. Secure elements can have secure storage independent of standard storage. The secure storage could be isolated physically and logically from the system to which the secure element is configured to operate with. In another approach, a secure element can be given limited memory as to prevent the manipulation of data, modules, or protocols stored within, and preclude the possibility of malicious code being locally installed or executed. In one example, the secure storage can be in the range of two hundred bytes to eight kilobytes. Secure elements can be permanently installed to the circuit board or chip package to which it is mounted to prevent physical tampering and removal. Secure elements may be further protected by tamper resistant packaging, such as an opaque cover, a tear-resistant mesh, a tamper sensor, a secure element that deletes the secure storage if a tamper is detected, or an element that destroys the secure element upon removal from the system.

In specific embodiments of the invention, the first device can be an application device and the second device can be a personal user device. An application device may be directed towards one or few applications, and may be optimized with minimal components to approach minimal cost for manufacture. An application device can be configured to serve a specific purpose in concert with a personal user device and can therefore be a "peripheral" of the personal user device. In one example, an application device can have a secure element that can store private data and instantiate a connection protocol module and a connection protocol key generator. In another example, an application device can have a data reader with a data processing module, the latter of which is instantiated by a secure element and communicatively connected to said data reader. In a third example, an application device can include a secure element that is a discrete integrated circuit and includes less than twenty kilobytes of writable secure storage. The second device can be a personal user device, such as a smartphone, tablet, laptop, or other communications device that can enable cryptographic and authentication protocols. A personal user device can execute myriad types of applications. For example, a personal user device can have a processor that instantiates a connection protocol module and an operating system. In the same example, the personal user device can communicatively connect with another device, as well as participate in authentication and establishing a secure connection with that device. Throughout this disclosure the terms "first" and "second" device will be used to refer to these devices where the use of these terms is meant to include, but not be limited to, the examples provided above where the first device is an application device and the second device is a personal user device.

Advantages accrue to embodiments of the invention where the first device is a peripheral with limited secure memory and a symmetric pairing key can be implemented for the handshake to provision a secure connection to the second device. By using a symmetric pairing key for the authentication and encryption handshake, fewer bytes of stored data are required in the first device through the omission of the certificates that would otherwise be needed for key generation during the handshake, such as in a public/private key scheme where private keys can be larger than authentication certificates. Concurrently, advantages accrue to approaches in which a seed is used for pairing key generation. In these approaches, the seed is never exposed outside of the secure device. As such, systems in which the secure element on the first device has sufficient processing resources to execute a cryptographic process using a pre-injected seed, a desirable tradeoff between the partitions of secure memory directed towards storage relative to cryptographic computations is provided by reducing the secure storage required for symmetric key generation. Furthermore, the peripheral can be a low-cost device provided by an entity responsible for securing the connection, and the second device can be a readily available device that is provided by a user. This particular cases is particularly amendable to certain approaches disclosed herein because the pairing key generation approach is only exposed on the secured peripheral and in the cloud architecture which provides a high degree of control to the provider of the peripheral while enabling the users to select from a wide range of devices to take the place of the second device.

Approaches that utilize symmetric pairing keys provide specific advantages over approaches that require the use of certificates with respect to authentication methods, in addition to key generation. Accordingly, the secure connection between the first device and second device can be added through a TLS handshake that utilizes symmetric keys instead of certificates. Using the public/private key X.509 standard to instantiate a secure TLS connection can require both devices to provide certificates for mutual authentication, where each certificate can be on the order of eight hundred to sixteen hundred bytes in size. In practice, using asymmetric digital signature methods such as Rivest-Shamir-Adleman (RSA), digital signature algorithm (DSA), or elliptic curve cryptography (ECC), the first device and the second device would each have to authenticate with a chain of two to four certificates, with the possibility of the matching private keys used for those certificates being even larger than the certificates themselves, further burdening the secure memory of the first device's secure element. Symmetric keys can alleviate this memory burden, comprising key data sizes on the order of 8 to 16 bytes through the use of smaller initial TLS handshake packets in the mutual authentication and fewer computations in the key generation process using the seed. Such approaches avoid public/private key processing times, which can be on the order of one hundred milliseconds. The benefits of smaller secure storage load and faster cryptographic processing can provide increased benefit, over their already distinct advantages, in secure systems designed for secure payments that must also process secure payment keys and payment authentication certificates with the already limited secure elements.

In specific embodiments of the invention, benefits accrue when the system includes a cloud architecture that stores the identity of a set of devices such as a set of peripheral devices. For example, a manufacturer could create a line of peripherals that utilize the system to securely connect to any given smartphone. These approaches are beneficial in that the cloud architecture can monitor the set of devices and maintain a record of compromised devices. In one example, a first device can be a peripheral device that has become suspected or known to be compromised, such as in the case where it has been stolen. To prevent insecure communications with the compromised first device, such findings can be reported in the cloud architecture. Accordingly, the first device under suspicion can be registered as a device that has been compromised. The transmission of the pairing key from the cloud architecture to the second device, as mentioned above, could be preconditioned on the first device not being registered as compromised in the cloud architecture. This can prevent the second device from being enabled to authenticate and generate a secure connection with a device that is compromised.

Specific embodiments of the invention exhibit certain benefits where the first device does not otherwise require a user interface with high functionality or does not need a user interface at all. Some device pairing schemes require the user entry of a shared secret to the application device to enable device pairing via a device interface. For example, one device could display a code, and the code would then be manually entered on a user interface on a second device. The mutual authentication and provisioning of the secure connections, through the secure storage of the shared secret on the first device, does not require a user to provide information to the first device for the process to proceed. As such, the first device can be a peripheral device as described above, with comparatively stringent size and security requirements with respect to user devices, and can often be constructed without a user interface.

FIG. 1 illustrates a system 100 for adding a secure connection 111 to an inter-device connection 110 between two discrete devices, for example a first device 120 and a second device 130, in conjunction with a cloud architecture 140. The first device 120 can be a peripheral, application device, or equivalent device type, of the second device 130. The second device 130 can be a personal user device, or equivalent device type. The inter-device connection 110 can be generated using a Bluetooth protocol and standard using a first Bluetooth module 121 on the first device 120 and a second Bluetooth module 131 on the second device 130. The secure connection 111 can be instantiated as a TLS connection. The inter-device connection 110 and the secure connection 111 communicatively connect the first device 120 and the second device 130 in a bidirectional fashion. Seeds and, equivalently, device secrets can be used in the system 100 in support the generating of pairing keys that can be subsequently used by the first device 120 and the second device 130 during the handshake for mutual authentication and the provisioning of the secure connection 111.

In specific embodiments of the invention, the system 100 can have a first device 120 with a secure element 122 that stores a device secret, and the cloud architecture 140 can store a mapping from an identification of the first device 120, such as a hardware identifier, to the device secret. The secure element 122 can be a discrete secure processor. The system 100 can also instantiate a first connection protocol key generator 123 and a second connection protocol key generator 141, on the first device 120 and the cloud architecture 140 respectively. The first connection protocol key generator 123 and the second connection protocol key generator 141 both can be configured to generate a pairing key using the seed. Key generators 123 and 141 can be implemented by secure elements that can be configured to securely store secret data sets and perform cryptographic operations, including the generation of a PSK. In one configuration, a secure element in communicative connection with a cloud architecture can store a cryptographic element, such as a key encrypting key (KEK), used to encrypt seeds stored in the cloud architecture. Seed encryption schemes using a KEK can include, for example, advanced encryption standard (AES) or data encryption standard (DES) symmetric key algorithms. Accordingly, a stored seed can be encrypted with a KEK to generate a PSK, wherein the PSK can be configured to be a pairing key. Furthermore, the first connection protocol key generator 123 and the second connection protocol key generator 141 both can be PSK generators compatible with TLS protocols. It is noted that the PSK or pairing key, after generation, can be used subsequently in additional processes, for example a TLS handshake where the PSK can be used as an input to enable calculations that ultimately derive the keys used directly for authentication and encryption.

Advantages accrue to specific embodiments where the seed is combined with other device-specific information in the cryptographic process used to generate the pairing key. One challenge in generating a secure symmetric pairing key with limited memory and processing capabilities is the process of creating a large and truly random number. Typical algorithms for this task can take significant calculation resources if performed onboard the device. Alternatively, a key can be loaded in a certified key injection facility, or a remote equivalent thereof, but in these environments the amount of available "keying" material can be limited once the device is deployed. Combining device-specific data with the seed to generate the pairing key can alleviate this concern. For example, the generation of the pairing key using the seed can be a combination of the seed and additional device-specific data that is readily available to the device such as hardware identifiers, serial numbers, and equivalent device data on the first device.

Efficient processing of secure and secret information in the system 100 can be implemented by organizing the information into sets. When a set of seeds are mapped to a set of device identifications, the set of seeds can be called a set of device secrets. As such, the mapping can therefore include a set of device secrets and a set of identifications. Furthermore, the set of identifications, by the correlation of each identification to a unique device, can identify the set of the devices 150. In some embodiments, the cloud architecture 140 can store the set of device secrets and be configured to generate a set of pairing keys using said set of device secrets. The key generation can be accomplished with the second connection protocol key generator 141. The cloud architecture 140 can be communicatively connected to the set of devices 150 via a communicative internet connection 113 to track status of the generated and stored pairing keys in tandem with the associated set of devices 150. Control of the key pairs and the associated set of devices 150 at the cloud architecture 140 level provides benefits by enabling the invalidity of pairing keys and devices when they have become compromised.

The process of facilitating the necessary information transfer between the first device 120 and cloud architecture 140 to generate the secure connection 111 between the first device 120 and the second device 130 can be mediated by the second device 130 for enhanced security. First, the second device 130 can be required to authenticate its identity to the cloud architecture 140 server, for example using an installed application for the delivery of a password and user name combination, a PKI authentication scheme, or other viable methods. If the second device 130 authentication is successful, the first device 120 can transmit the identification of the first device to the second device 130 using the inter-device connection 110, after which the second device 130 can exchange the identification of the first device to the cloud architecture 140 in exchange for the pairing key. The transferring of the identification of the first device to the cloud architecture 140 by the second device 130 can be accomplished, for example, using a communicative network connection 112. The pairing key can be generated by the second connection protocol key generator 141, in part using the device secret mapped to the identification of the first device, and transmitted from the cloud architecture 140 to the second device 130 in response to receiving the device identifier from the second device 130. Alternatively, the first device can send its own identity and an identity of the second device using a direct connection between the first device and the cloud architecture, at which point the cloud architecture will deliver the pairing key to the second device.

The system can be in a state where the second device 130 can be in possession of and securely store the pairing key, and the first device can be in possession of and securely store the pairing key generated by the first connection protocol key generator 123. In this state, a first connection protocol module 124 instantiated by the secure element 122 of the first device 120, and a second connection protocol module 132 instantiated by a processor 133 on the second device 130, can both be configured to mutually authenticate and add the secure connection 111 to the inter-device connection 110, using their respective pairing keys. The processor 133 can instantiate an operating system 134. The first connection protocol module 124 and the second connection protocol module 132 can be TLS modules.

In specific embodiments of the invention, a data reader 125 can be on the first device 120. The data reader 125 can be configured for securely reading data from secure data sources. For example, the data reader 125 can read secure data from: a data storage device, such as a USB drive; a device comprising a magnetic strip, such as a credit card; a device comprising an integrated circuit, such as an integrated circuit card (ICC); a user, such as a user with a biometric; nearby near field communications (NFC) supplied by a device, such as a smartphone; a barcode, such as identifying barcode on a physical item; or an image, such as the image of a personal check. In every embodiment, the data reader 125 can take the form of a device or system able to receive secure data, for example with reference the example embodiments above, a USB reader, a card reader, an ICC reader, an NFC communications device, a biometrics reader, a barcode scanner, or an image sensor. These examples merely show possible configurations of the data reader 125 and do not limit the embodiments that are encompassed by the complete scope of the invention. A data processing module 126, instantiated on the secure element 122, can subsequently receive the data through a communicative connection with the data reader 125. The data processing module 126 can interpret analog signals received from the data reader 125 and convert them into digital information. The data processing module 126 can also encrypt the received information and control the transfer of information out of secure element 122. The first device 120 is configured to transmit the digital information to the second device 130 using the secure connection 111.

In specific embodiments of the invention, the methods for adding a secure connection can be performed using a one-time password (OTP) method that generates an encryption key with a finite validity period. The key validity period can be any amount of time, such as the duration of a transaction, the duration of a log-in session, or a predetermined and fixed amount of time. Benefits follow from the implementation of an OTP key generation method as the limited key validity period minimizes the opportunity of an attacker to use a MITM replay or playback attack, in which a valid data packet can be deliberately delayed or improperly repeated to induce a security malfunction. OTP methods described herein can be applied to the connection protocol key generators on the first device 120 and the cloud architecture 140.

Figure 2:
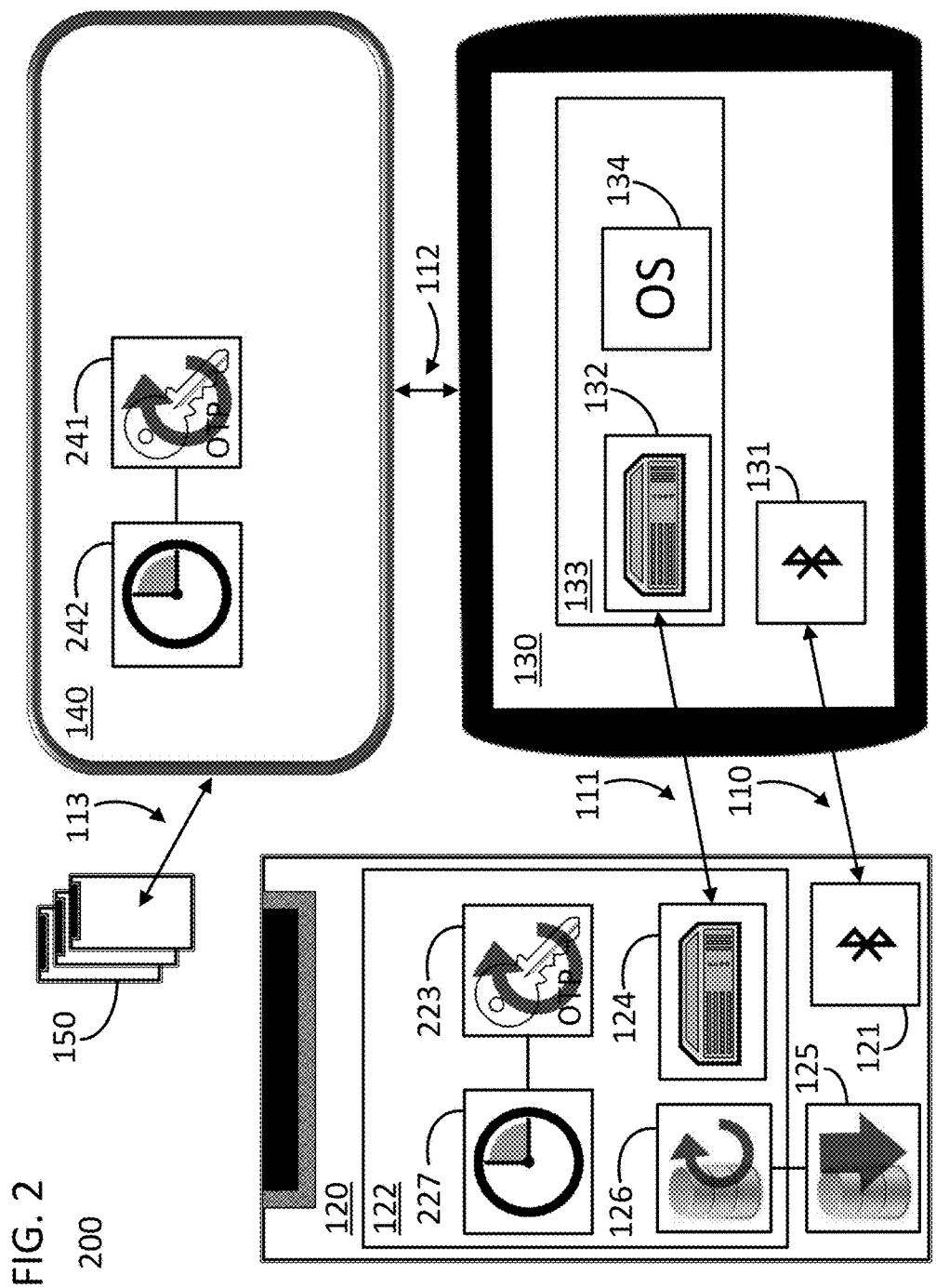
FIG. 2 illustrates the system from FIG. 1 in which the provisioning of the secure connection uses an OTP key encryption method to generate a pairing key.

FIG. 2 illustrates a system 200 for implementing an OTP key encryption method that can require specific modules and elements in addition to the modules and elements inherited from system 100. The first device 120 can have a first real time clock 227 that can be instantiated on the secure element 122 and can generate a first time stamp. The first device 120 can also have a first connection protocol key generator 223 that is configured to generate a pairing key from a device secret using the first time stamp from the first real time clock 227. In one example, the first time stamp incorporated pairing key can be an OTP key. The cloud architecture 140 can instantiate a second real time clock 242 that can generate a second time stamp. The real time can be loaded into the first device 120 in a secure facility before the device is deployed. Since the real time clock 227 is real time, it can be used in synchronized cryptographic approaches with cloud architecture 140 for the rest of its life as long as the real time clock 227 is not disturbed. The cloud architecture 140 can also have a second connection protocol key generator 241 that is configured to generate a pairing key from a device secret using the second time stamp from the second real time clock 242. In one example, the second time stamp incorporated pairing key can be an OTP key. In using the first connection protocol key generator 223 and the second connection protocol key generator 241 using a device secret and a time stamp to generate pairing keys, PSKs, TLS PSKs, or equivalent encrypted keys, these keys can acquire the qualities of an OTP key and a limited time validity.

In specific embodiments of the invention, OTP key generation methods can contain multiple steps that are identically followed by the first device 120 and the cloud architecture 140 to generate a symmetric set of pairing keys. The following described steps below are one example of the set of identical, multiple steps described above. In a first step, the keying data sets to be used by the key generator, such as a seed or device secret, can be provisioned. The provisioning of this information to the first device can 120 be conducted while the device is in a secure key injection facility or remotely using a remote key injection protocol. In a second step, the OTP key generation algorithm, and the algorithm parameters, can be chosen. In one example, the algorithm can be a hash-based message authentication code (HMAC) key generation algorithm. In another example, the algorithm parameters can comprise: a key generation interval that sets a time when a generated key can become invalid and a new one should be generated; a secure hashing algorithm, such as from the SHA series cryptographic hash functions published by the United States National Institute of Standards and Technology that mathematically operate on the device secret data sets to create a hash output used as source data for the key generation; a truncation length that determines the amount of source data to be used, which must be less than the length of the hash output; and other parameters used for key generation. In a third step, the OTP key generation algorithm can identify the data sets that will be used as a seed, which can be a device secret. In a fourth step, a time stamp can be generated by a real time clock. In one example, the real time cited on the time stamp can be defined as the current Unix epoch time, which is the time elapsed in seconds from the beginning of Jan. 1, 1970, coordinated universal time. In a fifth step, the pairing key can be computed using the OTP key generation algorithm using the selected parameters. In one example, the generated OTP pairing key can be in binary format.

Figure 3:
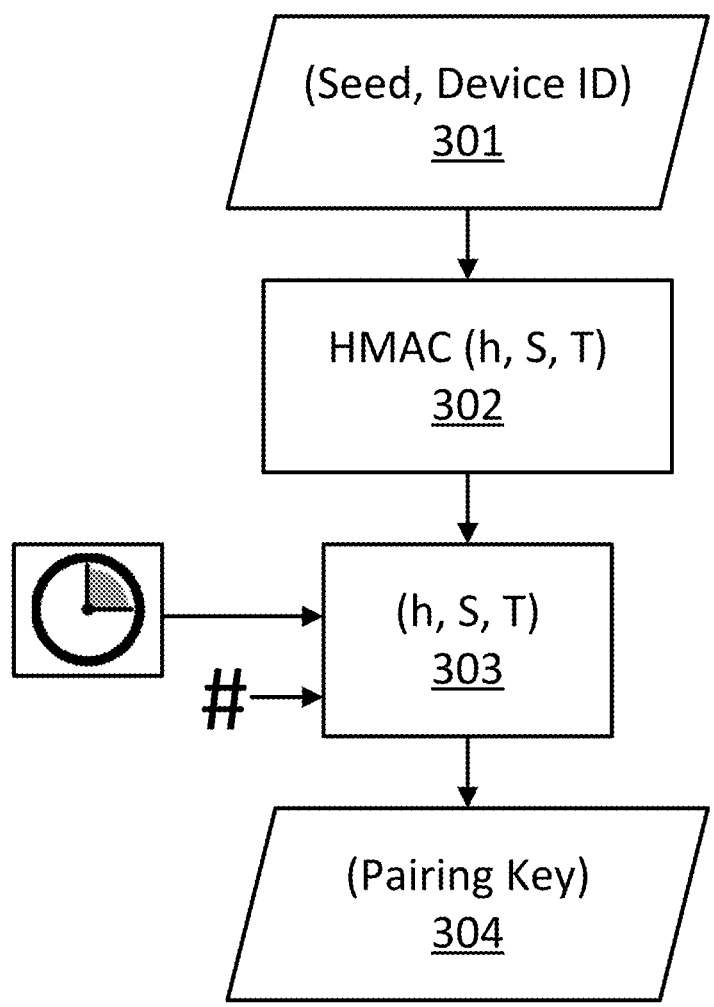
FIG. 3 illustrates a flow chart and block diagram that describes an example OTP key encryption method used by the system from FIG. 2.

FIG. 3 illustrates an example OTP key generation method 300 in accordance with the generation of a pairing key by a connection protocol key generator. The method 300 can start with the provisioning of the keying data sets 301 used by the key generator, such as a seed or device secret with additional device identifier information. Next, the instantiation of the OTP key generation algorithm 302 can proceed. The algorithm can be chosen from a set of algorithms during step 302 if multiple algorithms are available in the set. The OTP generation algorithm can be any viable algorithm, such as a request for comments (RFC) standard method as developed by the Internet Engineering Task Force. In some embodiments of method 300, the HMAC algorithm can be chosen as the OTP key generation algorithm. In one example implementation of the HMAC algorithm, the parameters include the hash function, h, the device secret, S, and the real time clock generated time stamp, T. The algorithm can import the parameters 303 necessary to define key generation execution. Finally, the pairing key can be generated 304 by computing the OTP algorithm, where the pairing key can be configured to be usable as a PSK for TLS protocols. When applied to the key generator modules used in system 200, the specific implementation of the method 300 can vary. However, certain mechanisms need to be identically deployed to assure that the key generator module in the cloud architecture 140 and on the first device 120 agree regarding which implementation to apply at any given time. In some approaches, the cloud architecture 140 and the first device 120 receive instructions prior to the generation of a pairing key regarding which implementation to apply for the next key generated.

In specific approaches to the invention, the cloud architecture 140 can include elements and modules that enhance the functionality and security of methods and systems described herein. The cloud architecture 140 can include a hardware security module (HSM). HSMs can be similar to secure elements in that they can provide layers of security unavailable to generic elements. However, HSMs are distinguished from secure elements per se because HSMs are designed to store, generate, process, categorize, and transfer encryption keys. Accordingly, HSMs can include any type of secure element to accomplish these ends, such as a secure processor, secure data storage, encryption modules, decryption modules, key generators, clocks, secure input elements to receive remote control commands, and other secure elements. HSMs can be installed locally on a device as a secure element. Alternatively, HSMs can be operated remotely and transfer secure information, such as an encryption key, to the system of interest over a secure connection. HSMs with advanced functionality can be utilized in a system back-end architecture, such as a cloud architecture 140, where the system back-end design is not limited by, for example, hardware component size, processing resources, or battery energy storage. The modules, elements, and hardware used in one embodiment to implement an HSM can be considered equivalent to another HSM embodiment regardless of the HSM installation location, such as a device or a cloud architecture, unless defined otherwise. It is also noted that while an HSM is integral to the security of its elements and modules and hence the system, the process does not absolutely require an HSM to execute the disclosed method steps. These steps may be carried out by a generic processor supported by the necessary elements and modules if the application's security requirements are sustained.

In specific approaches to the invention, the cloud architecture 140 can include a database to securely store the information needed to log the collection of keys, devices, device identifiers, device secrets, and related tracking and provisioning information. The database can remain secure while residing outside of the HSM through an implementation of data encryption, for example by using a key encrypting key technique that is described below. The cloud architecture 140 can include a web server to receive, store, process, and deliver information from the cloud architecture 140 securely to another device in the system, such as the second device 130. The web server can establish a secure connection, for example by forming a TLS connection secured with a hypertext transfer protocol secure (HTTPS), with another device after the connecting device has provided the required credentials, such as a device identifier. After the secure connection has been established, private information, such as pairing keys, may be transmitted over the secure connection.

Figure 4:
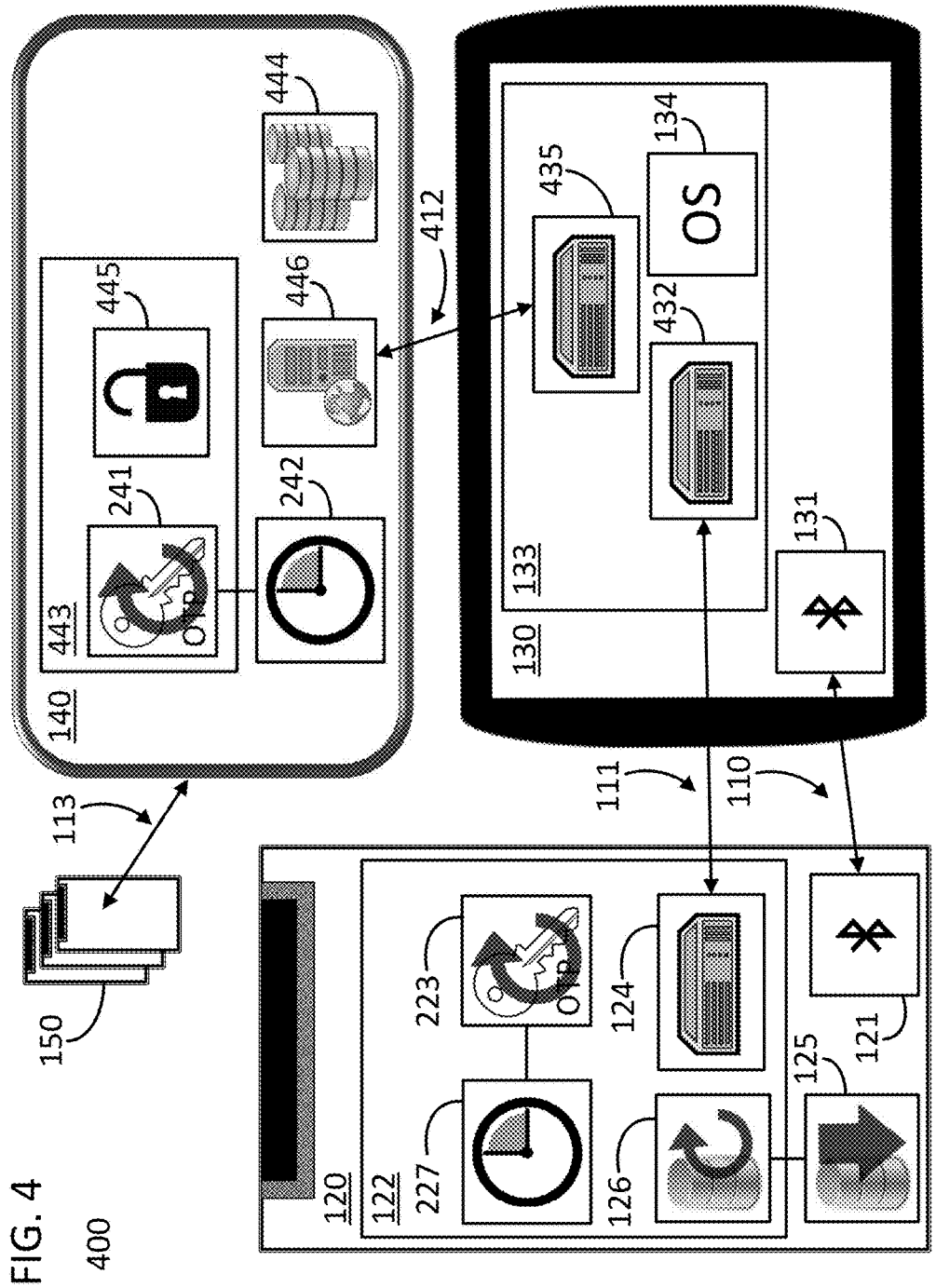
FIG. 4 illustrates the system from FIG. 2 with added security and communications elements and modules to the cloud architecture.

FIG. 4 illustrates an example cloud architecture 140 in system 400 that can include an HSM, a database, and a webserver for secure key generation and transmission involving the cloud architecture 140, in addition to the modules and elements inherited from systems 100 and 200. In one example, a hardware security module 443 can store a key encrypting key and instantiate the second connection protocol key generator 241 to enable the generating of a pairing key on the cloud architecture 140. KEKs can provide a layer of security on the data sets that are used to generate encryption keys at a later encryption steps, such as pairing key or a PSK. A KEK used in this way can complement the encryption steps implemented, for example, by a second connection protocol key generator 241 that uses an OTP encryption algorithm with a second time stamp from a second real time clock 242. A KEK can be used to encrypt a device secret on the cloud architecture 140 to create an encrypted device secret. Since the pairing key can be generated with a device secret associated with a mapping to an identifier of a device, a database 444 on the cloud architecture 140 can contain the necessary information to provision the key generator 241 at the appropriate time. As such, the database 444 can contain the mapping while storing the device secret as an encrypted device secret and retrieve the encrypted device secret using the device identifier. The encrypted device secret must be decrypted prior to being used for key generation and can be so decrypted by decryption module 445 as instantiated on the hardware security module 443. After decryption, the second connection protocol key generator 241 on the cloud architecture 140 can be used, with the device secret, to generate the pairing key. In one example, the second real time clock 242 can be instantiated on the cloud architecture 140 and off the hardware security module 443. In another valid example, the second real time clock 242 can be instantiated on the hardware security module 443 and retain the same functionality with additional security.

In one example, the cloud architecture 140 can contain a web server 446 configured to receive a device identification from a second device 130 to authenticate the second device 130, can access the mapping from the database 444 using the device identification, and can transmit the pairing key to the second device 120 after accessing the mapping to forward the TLS handshake, the process of mutual authentication and provisioning a secure connection 111 to the inter-device connection 110 between the first device 120 and the second device 130. In another example, the second device 130 can have two, separated TLS connection protocol modules 432 and 435. TLS connection protocol module 432 can be instantiated on the processor 133 to provision the secure connection 111 in line with methods described for the second connection protocol module 132, where the secure connection 111 can be a TLS connection. TLS connection protocol module 435, a third connection protocol module of system 400, can also be instantiated on the processor 133 while remaining functionally separate from TLS connection protocol 432, or it could be instantiated elsewhere on the second device 130. TLS connection protocol module 435 can form a connection 412 with the web server 446 from the second device 130. The connection 412 can be authenticated and encrypted using HTTPS protocols.

Authentication of the second device 130 to the web server 446 on the cloud architecture 140 can enable unique security mechanisms such as the prevention of the cloud architecture from provisioning a pairing key to a malicious party. In some embodiments of the invention, the authentication of the second device 130 to the cloud architecture 140 can be implemented using an application installed on the second device 130. The application can be configured to be managed by the operating system 134 and instantiated by the processor 133 using the operating system 134. The application can be implemented using a method to verify the identity of the user of the second device 130. The application can use the elements and modules on the second device 130 to aid in the task of user identification. The application can, for example, perform second device 130 authentication by asking the user to input a username and password using display device and input device technologies, such as a touch screen display, that can be relayed to the web server 446 for authentication. The process by which the user provides private user information to authenticate is generally called knowledge-based authentication. Related methods may include different or additional security questions, such as personal identification numbers (PINS), personal user questions answered before hand and accessible to the web server 446, or even pictographic questions. In other authentication processes, the application can ask for a user biometric, such as a finger print, voice command, retina scan, or facial recognition image, supplied to the application through the sensor elements on the second device 130. In another scenario, since the second device 130 is usually not burdened by the same element and module restrictions as the first device 120, the second device 130 can implement standard authentication and cryptographic protocols, such as by using certificates and private/public key cryptography. Authentication by the application can incorporate the second connection protocol module 132, or equivalently TLS connection protocol module 432, to be part of the application. In another example, authentication by the application can incorporate TLS connection protocol module 435. As part of the application, the protocol module can be used to exchange the identification of the first device 120 for a pairing key upon authentication of the second device 130 via the application, for example over connection 412. In other words, the transmission of the pairing key from the cloud architecture 140 in this exchange can be preconditioned on the application authentication process of the second device 130.

Communications between the second device 130 and the cloud architecture 140 can be conducted by TLS connection protocol module 435 on the second device 130 with the web server 446 on the cloud architecture 140. TLS connection protocol modules 435 can provision connection 412 with standard wireless protocols as described above, including TLS protocols. The TLS protocol can use HTTPS to establish a secure connection. In some embodiments, the second device 130 can be a smart phone and TLS connection protocol module 435 can be the native TLS connection protocol module configured by the original equipment manufacturer (OEM) or by original operating system install. If such a TLS connection protocol models 435 is used to communicate with cloud architecture 140, additional layers of cryptographic security may be implemented within the TLS connection provisioned by the module when required by the sensitive nature of the private data being transported through device 130. In alternative embodiments, TLS connection protocol module 432 can be used to communicated with webserver 446. In these embodiments, TLS connection protocol module 432 can be instantiated by the application and can be enabled to connect to the web server 446 over a connection other than a websocket protocol.

Figure 5:
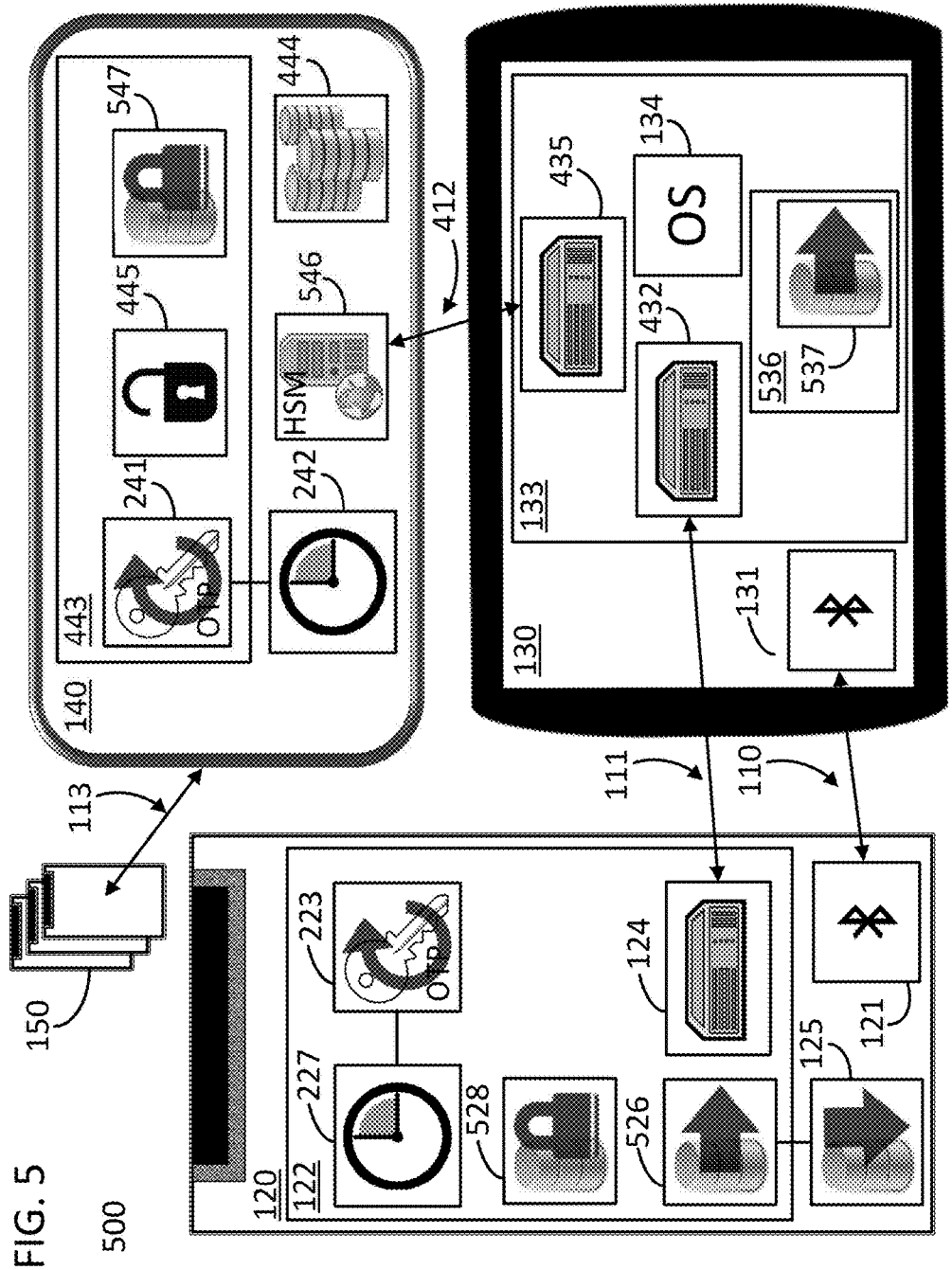
FIG. 5 illustrates the system from FIG. 4 with added elements and modules that enable the system for use with secure payment data.

FIG. 5 illustrates system 500 that can perform secure payment transactions with secure payment and secure storage modules, in addition to the modules and elements inherited from systems 100, 200, and 400. These secure payment and secure storage modules can also support authentication and cryptographic processes, such as the TLS handshake between the first device 120 and the second device 130. To this end, the first device 120 can have a secure payment logic module 526 on secure element 122. The secure payment logic module 526 can incorporate the properties of the data processing module 126 that enable it to receive and process data from the data reader 125. As the data reader 125 can receive payment information in the data supplied to it, the secure payment logic module 526 can receive and further process secure payment information according to secure payment standards, such as the payment card industry data security standard. The second device 130 can process secure information using an application 536, which can also function as described above with respect to the TLS connection protocol modules. The application 536 can be instantiated by the processor 133 and instantiate payment logic module 537 that can work in concert with secure payment logic module 526 over the secure connection 111. In some embodiments of the invention, the first device 120 can receive payment information related to a payment transaction at data reader 125, and process the payment information at secure payment logic module 526 to be in condition to send to payment logic module 537 over the secure connection 111. The payment information can be further processed by the application 536 with the payment logic module 537 and relevant portions of the payment information may be sent elsewhere, for example over a connection established by one of the TLS connection protocol modules.

In commercial settings where secure payments are used and customer interactions are expected, the enhanced usability of the system 500 is desired. To improve the processing speed at which a secure connection can be provisioned, the first device 120 can aid in the processing time required to conduct a handshake by providing a key identity hint whenever the secure protocol permits. The hint can be generated on the first device 120 as a data set that includes data from first device 120 along with the identification of the first device. For example, the hint can be a combination of the device identifier along with a time stamp. The timestamp can be provided by a secure clock operating on the first device such as clock 227 in the examples above.

In some embodiments of the invention, the secure modules can be added to enable the secure and local storage of critical and private data used for the TLS handshake. On the cloud architecture 140, the hardware security module 443 can include secure storage module 547 to store a KEK used for the generation of a TLS PSK or a pairing key. On the first device 120, the secure element 122 can include secure storage module 528 to store a loaded device secret. In some approaches in which a device secret is used to generate a PSK for a TLS handshake, the secure storage can be less than twenty kilobytes.

The hardware security module 443 on the cloud architecture 140 is a configurable module. In one example, the hardware security module 443 can be configured to operate without a control module, suitable for instances when a small set of cryptographic commands are necessary. In a different example, the hardware security module 443 can be given commands with a control module, such as a control computer, to enable the execution of stored programs. In this example, the control computer can accommodate one of many configurations, such as an isolated module in communicative connection with the secure storage module 547 or, alternatively, fully incorporated into the web server 546.

In some embodiments of the invention, methods can be implemented to verify the state of security in the second device 130 in order to halt operations if it has been compromised. The application 536 on the second device 130 can transmit location telemetry, for example GPS coordinates, to the cloud architecture 140 for the duration of the application 536 installation to store a data set of credible locations for use of the second device 130 with the first device 120 on which machine learning algorithms can learn. If it has been determined from the learning algorithm analysis that a second device 130 has been compromised, the cloud architecture 140 can be instructed to halt the transmission of pairing keys to that second device 130.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. The terminal can be a computer terminal, a smartphone, a point of sale terminal, a repeater, a beacon, a sensor, or any other device that collects and transmits secure information. Although examples in the disclosure were generally directed to TLS, any number of communication protocols with similar characteristics in terms of providing both security and authentication to a two-way stream of communication could be used in its place. These and other modifications and variations to the present invention may be practiced by those skilled in the art, without departing from the scope of the present invention, which is more particularly set forth in the appended claims.

What is claimed is:

1. A system for provisioning a secure connection to an inter-device connection, comprising:
  a first device having a secure element, wherein the secure element: (i) stores a device secret; (ii) instantiates a first connection protocol module; and (iii) instantiates a first connection protocol key generator;
  a cloud architecture that: (i) stores a mapping from the device secret to an identification of the first device; and (ii) instantiates a second connection protocol key generator;
  wherein the first connection protocol key generator and the second connection protocol key generator are both configured to generate a pairing key using the device secret;
  wherein the first connection protocol key generator generates the pairing key using a first time stamp generated on the first device;
  wherein the second connection protocol key generator generates the pairing key using a second time stamp generated in the cloud architecture; and
  a second device that: (i) has a processor which instantiates a second connection protocol module; (ii) is communicatively connected to the first device via the inter-device connection; (iii) is configured to receive the identification of the first device from the first device; and (iv) is configured to exchange the identification of the first device for the pairing key with the cloud architecture over a network connection;

wherein the pairing key is symmetrical pre-shared key generated using identical steps on the first device and in the cloud architecture;

wherein the first connection protocol module and the second connection protocol module are configured to: (i) mutually authenticate using the pairing key; and (ii) add the secure connection to the inter-device connection using the pairing key.

2. The system from claim 1, further comprising:
a data reader on the first device; and
a data processing module instantiated by the secure element and communicatively connected to the data reader for receiving data;
wherein the first device is configured to transmit data reader data to the second device using the secure connection.

3. The system from claim 2, wherein:
the second device is a personal user device;
the processor instantiates an operating system;
the first device is a peripheral of the second device;
the secure element is a discrete secure processor;
the first and second connection protocol modules are transport layer security (TLS) modules;
the first and second connection protocol key generators are TLS pre-shared key (PSK) generators;
the pairing key is a PSK; and
the secure connection is a TLS connection.

4. The system from claim 1, further comprising:
a first real time clock instantiated on the secure element;
wherein the first connection protocol key generator is configured to use a first time stamp from the first real time clock to generate the pairing key from the device secret;
a second real time clock instantiated on the cloud architecture; and
wherein the second connection protocol key generator is configured to use a second time stamp from the second real time clock to generate the pairing key from the device secret.

5. The system from claim 1, wherein the cloud architecture further comprises:
a hardware security module storing a key encrypting key and instantiating the second connection protocol key generator;
a database containing the mapping, wherein the database stores the device secret as an encrypted device secret; and
a decryption module instantiated on the hardware security module and configured to decrypt the encrypted device secret using the key encrypting key.

6. The system from claim 1, wherein the cloud architecture further comprises:
a web server configured to receive the identification of the first device from the second device, access the mapping using the identification of the first device, and transmit the pairing key to the second device after accessing the mapping.

7. The system from claim 6, further comprising:
an HTTPS connection between the web server and the second device; and a third connection protocol module instantiated on the second device and configured to form the HTTPS connection with the web server;
wherein the second and third connection protocol modules are separate TLS modules.

8. The system from claim 1, further comprising:
an operating system and an application of the operating system that are instantiated by the processor on the second device;
wherein the second connection protocol module is part of the application;
wherein the application is configured to authenticate the second device to the cloud architecture; and
wherein the cloud architecture is configured to precondition the exchange of the identification of the first device for the pairing key with an authentication of the second device via the application.

9. The system from claim 1, wherein the secure element:
is a discrete integrated circuit; and
includes less than 20 kilobytes of writable secure storage.

10. The system from claim 1, wherein:
the mapping includes a set of device secrets and a set of identifications;
the set of identifications identify a set of devices;
the cloud architecture is communicatively connected to the set of devices via the internet; and
the second connection protocol key generator is configured to generate a set of pairing keys using the set of device secrets.

11. A method for provisioning a secure connection to an inter-device connection between a first device and a second device, comprising:
storing a device secret on a secure element in the first device;
storing a mapping from the device secret to a device identifier of the first device on a cloud architecture;
generating a first time stamp on the first device;
generating a second time stamp in the cloud architecture;
generating a pairing key using: (i) a first connection protocol key generator on the secure element; (ii) the first time stamp; and (iii) the device secret;
generating the pairing key using: (i) a second connection protocol key generator on the cloud architecture; (ii) the second time stamp; and (iii) the device secret;
transmitting the pairing key from the cloud architecture to the second device in response to receiving the device identifier;
mutually authenticating the first and second devices using the pairing key as stored on the first device and as stored on the second device; and
adding the secure connection to the inter-device connection using the pairing key as stored on the first device and as stored on the second device;
wherein the pairing key is a symmetrical pre-shared key generated using identical steps on the first device and in the cloud architecture.

12. The method of claim 11, further comprising:
receiving data using a data reader on the first device; and
transferring the data from the first device to the second device using the secure connection.

13. The method from claim 12, wherein:
the second device is a personal user device with an operating system;
the first device is a peripheral of the second device;
the secure element is a discrete secure processor;
the first and second connection protocol key generators are TLS pre-shared key (PSK) generators;

the pairing key is a PSK; and
the secure connection is a TLS connection.

14. The method from claim 11, further comprising:
generating a first time stamp using a first real time clock on the secure element;
generating a second time stamp using a second real time clock on the cloud architecture;
wherein the generating the pairing key using the first connection protocol key generator uses the first time stamp; and
wherein the generating the pairing key using the second connection protocol key generator uses the second time stamp.

15. The method from claim 11, further comprising:
encrypting the device secret on the cloud architecture to create an encrypted device secret;
retrieving the encrypted device secret from a database of the cloud architecture using the device identifier;
decrypting the encrypted device secret using a hardware security module of the cloud architecture before generating the pairing key using the second connection protocol key generator on the cloud architecture and the device secret; and
wherein the second connection protocol key generator is instantiated by the hardware security module.

16. The method from claim 11, further comprising:
receiving the device identifier from the second device using a web server of the cloud architecture;
wherein the transmitting of the pairing key from the cloud architecture to the second device uses the web server.

17. The method from claim 16, further comprising:
forming an HTTPS connection between the web server and the second device using a TLS connection protocol module instantiated on the second device;
wherein a separate TLS protocol module adds the secure connection to the inter-device connection.

18. The method from claim 11, further comprising:
instantiating an application using an operating system on the second device;
authenticating the second device to the cloud architecture using the application; and
preconditioning a transmission of the pairing key from the cloud architecture to the second device on with an authentication of the second device via the application.

19. The method from claim 11, wherein the secure element:
is a discrete integrated circuit; and
includes less than 20 kilobytes of writable secure storage.

20. The method from claim 11, further comprising:
storing a set of device secrets on the cloud architecture; and
generating a set of pairing keys using the set of device secrets on the cloud architecture;
wherein the mapping includes a set of identifications; and
wherein the set of identifications identify a set of devices.

21. The method from claim 11, further comprising:
generating a time stamp using a real time clock on the cloud architecture;
generating a key identity hint on the second device using the time stamp and the device identifier; and
transmitting the key identity hint from the second device to the first device while adding the secure connection to the inter-device connection.

22. The method from claim 11, further comprising:
registering a third device as compromised in the cloud architecture; and
preconditioning a transmission of the pairing key from the cloud architecture to the second device on the first device not being registered as compromised in the cloud architecture.

23. The method from claim 11, further comprising:
generating the inter-device connection using a first Bluetooth module on the first device and a second Bluetooth module on the second device;
transmitting the device identifier from the first device to the second device using the inter-device connection; and
transmitting the device identifier from the second device to the cloud architecture using a network connection.

24. The method from claim 11, further comprising:
generating a first time stamp using a first real time clock on the secure element;
wherein the generating of the pairing key using the first connection protocol key generator uses the first time stamp; and
wherein the pairing key is a one time use pairing (OTP) key.

25. A system comprising:
a first device;
a second device with an inter-device connection to the first device;
a secure element in the first device storing a device secret;
a cloud architecture storing the device secret and a mapping from the device secret to a device identifier of the first device;
a first connection protocol key generator on the secure element configured to generate a pairing key using the device secret;
wherein the first connection protocol key generator generates the pairing key using a first time stamp generated on the first device;
a second connection protocol key generator on the cloud architecture configured to generate the pairing key using the device secret;
wherein the second connection protocol key generator generates the pairing key using a second time stamp generated in the cloud architecture;
a first connection protocol module instantiated by the secure element;
a second connection protocol module on the second device;
an application on the second device that receives the pairing key from the cloud architecture and instantiates the second connection protocol module;
wherein the cloud architecture is configured to transmit the pairing key to the second device in response to receiving the device identifier;
wherein the first connection protocol module and the second connection protocol module are configured to: (i) mutually authenticate using the pairing key; and (ii) add a secure connection to the inter-device connection using the pairing key; and
wherein the pairing key is a symmetrical pre-shared key generated using identical steps on the first device and in the cloud architecture.

26. The system from claim 25, further comprising:
a data reader on the first device; and
a data processing module instantiated by the secure element and communicatively connected to the data reader for receiving data;
wherein the first device is configured to transmit data reader data to the second device using the secure connection.

27. The system from claim 26, wherein:
the second device: (i) is a personal user device; and (ii) has a processor;
the processor instantiates an operating system;
the first device is a peripheral of the second device;
the secure element is a discrete secure processor;
the first and second connection protocol modules are transport layer security (TLS) modules;
the first and second connection protocol key generators are TLS pre-shared key (PSK) generators;
the pairing key is a PSK key; and
the secure connection is a TLS connection.

28. The system from claim 26, further comprising:
a first real time clock instantiated on the secure element;
wherein the first connection protocol key generator is configured to use a first time stamp from the first real time clock to generate the pairing key from the device secret;
a second real time clock instantiated on the cloud architecture; and
wherein the second connection protocol key generator is configured to use a second time stamp from the second real time clock to generate the pairing key from the device secret; and
wherein the pairing key is a one time use pairing key.

* * * * *